US008286269B2

(12) United States Patent
Springer et al.

(10) Patent No.: US 8,286,269 B2
(45) Date of Patent: Oct. 16, 2012

(54) HARD HAT WITH ATTACHED SAFETY GLASSES

(76) Inventors: David J. Springer, Labrador (AU); William McMinn, Coomera Shores (AU)

(*) Notice: Subject to any disclaimer, the term of this patent is extended or adjusted under 35 U.S.C. 154(b) by 308 days.

(21) Appl. No.: 12/396,046

(22) Filed: Mar. 2, 2009

(65) Prior Publication Data

US 2009/0235437 A1    Sep. 24, 2009

Related U.S. Application Data

(63) Continuation-in-part of application No. PCT/AU2007/001260, filed on Aug. 31, 2007.

(30) Foreign Application Priority Data

Aug. 31, 2006 (AU) .................. 2006904744

(51) Int. Cl.
 *A42B 1/24* (2006.01)
(52) U.S. Cl. .................. 2/422; 2/15; 2/426; 2/453; 2/10
(58) Field of Classification Search .................. 2/10, 15, 2/12, 13, 9, 451, 453, 454, 426, 427, 431, 2/438, 448, 450, 439
See application file for complete search history.

(56) References Cited

U.S. PATENT DOCUMENTS 2,648,091 A  8/1953 Jones
4,432,100 A  2/1984 Bates
4,819,274 A  4/1989 Day
4,951,316 A  8/1990 Moody
5,052,054 A * 10/1991 Birum ................. 2/10
5,129,102 A  7/1992 Solo
5,193,226 A * 3/1993 Mortenson ............ 2/422
5,289,592 A * 3/1994 Paivarinta ............. 2/431
5,533,207 A  7/1996 Diaz
5,920,371 A * 7/1999 Chang et al. ........... 351/158
5,926,854 A * 7/1999 Grilliot et al. ........... 2/424
5,987,640 A  11/1999 Ryder
6,282,726 B1  9/2001 Noyerie et al.
6,807,679 B1 * 10/2004 Wang-Lee ............. 2/10
6,959,989 B2  11/2005 Holm
2004/0051015 A1 * 3/2004 Ohrling ............... 248/214

FOREIGN PATENT DOCUMENTS

FR    2 717 047 A1    9/1995
WO   WO 2006/088408 A1    8/2006

* cited by examiner

*Primary Examiner* — Khoa Huynh
*Assistant Examiner* — Andrew W Collins
(74) *Attorney, Agent, or Firm* — Alston & Bird LLP (57) ABSTRACT

A hard hat with attached glasses including a hard hat including a dome portion, the dome portion having an interior surface defining a dome space for receiving a wearer's head and said interior surface including a generally vertical front portion, a pair of glasses and a connection system connecting said pair of glasses to said hard hat, the connection system adapted to allow adjustment of the position of the glasses inside said dome space and down out of said dome space and pivotable about a substantially horizontal axis.

28 Claims, 6 Drawing Sheets

FIG. 8 ically set forth herein, any prior patents which may have been granted on the prior art, or any writings which may have been published in the United States or elsewhere.

HARD HAT WITH ATTACHED SAFETY GLASSES

CROSS-REFERENCE PARAGRAPH

This application is a continuation-in-part of PCT Application No. PCT/AU2007/001260, filed Aug. 31, 2007, which claims the benefit of Australian Application No. 2006904744, filed Aug. 31, 2006, which are hereby incorporated herein in their entirety by reference.

FIELD OF THE INVENTION

The present invention relates to safety glasses and more particularly, to glasses attached to headwear.

BACKGROUND ART

Articles of head wear with attached glasses for use as sun or safety glasses are available in the art.

One example of such devices is disclosed in U.S. Pat. No. 6,959,989 and which contains an excellent summary of the prior art and their respective inadequacies. An excerpt from the Background Art portion of that document is reproduced below verbatim.

"On construction sites, workers must wear protective gear for their heads and eyes. Safety goggles are typically uncomfortable to wear, especially during hot weather when the air inside goggles can become very hot. Also, wearer's frequently remove their goggles for various reasons such as to wipe sweat out of their eyes or to improve the acuity of their vision. Thus, it is common for safety goggles to be damaged or lost. One solution to this problem is to attach a pair of protective glasses to the bill of the worker's safety helmet. Means for flipping the safety glasses up toward the helmet bill away from the wearer's face allows the wearer to "remove" the glasses without the danger that they will be lost or damaged while not in use.

Existing means for attaching safety glasses to a helmet do not allow for the position of the glasses to be adjusted relative to the user's face. Because very person's face is unique, safety glasses attached at a given point may be too close to one wearer's face and too far away from another. Unfortunately, safety helmets are from time to time struck by other objects. Because existing means for attaching safety glasses are rigid, the shock from such a blow can be transferred from the glasses to the user's face. This is especially problematic when the glasses are too close to the user's face. Similarly, the safety glasses may be struck directly, which can break them or result in the helmet being knocked off.

Issued patents relating to safety glasses attached to headwear are reviewed hereinafter.

Jones (U.S. Pat. No. 2,648,091) discloses a stud and socket snap fastener assembly, which is adapted for use in attaching an eyeshield to the visor of a cap.

Day (U.S. Pat. No. 4,819,274) discloses a detachable eye shield adjustably mounted on a mounting block which is removably engaged in a dovetail groove formed on the central portion of the under side of the visor member of the cap. A shaft member disposed on the upper frame of the eye shield is pivotally snap-engaged in the holder portion of the mounting block whereby the eye shield can be raised up and down relative to the visor member.

Moody (U.S. Pat. No. 4,951,316) discloses a sun visor with eyeshield in which the eyeshield can be positioned, in a positive and secure manner, both up and down and at incremental distances from the wearer's eyes.

Solo (U.S. Pat. No. 5,129,102) discloses a cap with removable flip up and down glasses. The lenses snap into the receiving member and pivot at its two attachment points.

Diaz (U.S. Pat. No. 5,533,207) discloses an eyeglass and cap combination in which eyeglasses downwardly depend from a projecting bill. PA pivot device connects the eyeglass frame with the bill whereby the eyeglasses may be positioned between an operative position in front of the eyes or a storage position adjacent to the bill or visor underside. The pivot device includes a frictional detent to maintain the eyeglasses in either one or the two positions.

Ryder (U.S. Pat. No. 5,987,640) discloses a visor and eyeshield combination that allows the wearer to adjust the eyeshield by flipping the eyeshield to a rest position or down to an in-use position. The wearer may also adjust the distance of the eyeshield from the wearer's face."

It will be clearly understood that, if a prior art publication is referred to herein; this reference does not constitute an admission that the publication forms part of the common general knowledge in the art in Australia or in any other country.

SUMMARY OF THE INVENTION

The present invention is directed to a hart hat with attached glasses, which may at least partially overcome at least one of the abovementioned disadvantages or provide the consumer with a useful or commercial choice.

In one form, the invention resides in a hard hat with attached pair of glasses including:

i) a dome portion, the dome portion having an interior surface defining a dome space for receiving a wearer's head and said interior surface including a generally vertical front portion; and ii) a connection system connecting said pair of glasses to said hard hat, the connection system adapted to allow adjustment of the position of the glasses inside said dome space and down out of said dome space and pivotable about a substantially horizontal axis, wherein the connection system includes:

i. at least one first portion extending into said dome space near said front portion of said interior surface;

ii. at least one second portion mounting said pair of glasses and holding said pair of glasses generally vertically for placement in front of a user's eyes, the at least one second portion being slidably connected to the at least one first portion to be slidable up inside said dome space and down out of said dome space generally parallel to said front portion of the interior surface to move the glasses up and down;

iii. a pivotable connection between the pair of glasses and the at least one second portion; and iv. means to provide movement of the glasses forwardly and rearwardly relative to the at least one position.

According to a second form, the invention resides in a connection system for connecting glasses to protective headwear, the connection system having at least one first portion adapted to be attached to protective headwear, at least one second portion mounting said glasses and holding said glasses generally vertically for placement in front of a user's eyes, the at least one second portion being slidably connected to the at least one first portion to be slidable generally parallel to a user's face to move the glasses up and down, a pivotable connection between the pair of glasses and the at least one second portion wherein either one of the at least one first or at least one second portion includes a channel and the other of the portions is elongated and slides in said channel to move the glasses and the connection system also having means to facilitate movement of the glasses forwardly and rearwardly relative to the at least one position.

The hard hat and glasses of the present invention will preferably allow a wearer with increased convenience. The pair of glasses provided as attached to the hard hat according to the invention will typically be moveable between a storage position in which the pair of glasses is stored inside the dome space of a hard hat and a use position in which the glasses are adjacent a wearer's eyes and/or face. The glasses of the invention are adjustable in multiple directions to also allow a wearer to move the glasses from the use position to a temporary non-use position adjacent a visor portion of the hard hat without moving the glasses to the storage position. This allows a wearer to temporarily remove the glasses from in front of their eyes for short periods but quickly and easily replace the glasses into the use position.

The term "hard hat" is used to define headwear which forms a part of the present invention will typically include helmets, hard hats, safety helmets or the like for providing protection from impacts. The invention is more specifically directed towards protective headwear which is worn on construction, mining and manufacturing sites.

The attached glasses which form a part of the present invention may be removable from the hard hat and/or replaceable. Ideally, the glasses used will be securely attachable relative to the at least one first portion. Normally, the at least one first portion of the connection system which is connected to the hard hat will be more or less permanently attached to the hard hat and the at least one second portion of the connection system to which the glasses are attached, is removably attachable to the at least one first portion.

In a most preferred form, the hard hat may include an extended front portion. The extended front portion typically enlarges the space in the dome portion so that the glasses can be stored inside the dome portion even whilst the hard hat is being worn by a wearer.

The hard hat of the invention may have a visor portion provided and typically, this visor portion will be integrally formed with the dome portion.

The hard hat will typically include a suspension arrangement within the dome space and attached to the interior surface. The suspension arrangement is typically spaced from the inner surface of the hard hat to provide clearance for ventilation and more importantly shock absorption if the exterior of the hard hat is impacted.

The suspension arrangement of the preferred embodiment generally includes a plurality of straps located in the dome space to maintain the spacing between the dome portion and the wearer's head. The straps of the preferred embodiment are generally resilient to flex when loads are applied and thereby absorb the shock of blows thereto.

The suspension arrangement preferably includes a circumferentially extending strap of adjustable length and a crown support. The circumferentially extending strap is suitably mounted relative to the interior surface of the dome portion at a number of spaced apart attachment locations by appropriate attachment means. There will generally be either four or six attachment locations spaced about a lower portion of the dome shaped portion depending upon the rating of the helmet.

The crown support of the suspension arrangement will typically include a plurality of straps extending radially from the crown of the suspension arrangement to a lower portion of the shell and typically to the circumferentially extending strap. Each of the radially extending straps will normally be attached to the attachment means that attaches the suspension arrangement to the dome portion. The number of straps will typically equal half the number of attachment locations of the helmet as the straps will typically extend from one side of the helmet to a point approximately opposite crossing over the crown. A substantially planar crown support member may be supplied and the straps may engage the crown support member to locate it. The straps are normally oriented in an X shape or Asterisk shape.

The dome space of the hard hat of the invention will typically be configured to provide a cavity or similar area between the front of the dome portion and the front of the suspension arrangement or wearer's head. The cavity will preferably be a shaped cavity integrally formed in the shell or a longer shell may be provided to space the front portion of the shell from the front portion of the suspension arrangement.

At least a portion of the cavity will preferably be configured to closely match the shape of the glasses as the glasses will generally have an arcuate frame or shape. Further, at least a portion of the cavity will normally be lined to protect the glasses from damage when in the storage position, particularly scratches and the like.

The term "pair of glasses" is used in the present specification to include any type of glasses that can be used to cover both eyes and therefore may be as simple as a curved sheet of material.

Preferably, the set of eyeglasses may be formed with two separated eyeglass members supported by a frame and a central nose-bridging portion. The frame may surround each of the eyeglass members.

In the alternative, the set of eyeglasses may be or include a unitary tinted sunglass sheet. This sunglass sheet is typically made from sheet material of uniform thickness, being of elongate form and symmetrical to each side of a middle nose-bridging portion. The eyeglass-shaped portions will preferably have curved lower edges at each side of the nose-bridging portion. In one embodiment, the flexible tinted sunglass sheet has resilient cheek-contact members fitted to the lower edges of both eyeglass-shaped portions. The flexible tinted sunglass sheet may also have a resilient nose-contact member fitted to the lower edge of the nose-bridging portion, the resilient contact members preferably being made of foam rubber.

The glasses may be or include corrective eyewear but will usually be protective or safety eyewear. Safety glasses are usually made with shatter-resistant plastic lenses to protect the eye from flying debris. Although safety lenses may be constructed from a variety of materials that vary in impact resistance, certain standards suggest that they maintain a minimum 1 millimetre thickness at the thinnest point, regardless of material. Safety glasses can vary in the level of protection they provide. For example, those used in medicine may be expected to protect against blood splatter while safety glasses in a factory might have stronger lenses and a stronger frame with additional shields at the temples. The lenses of safety glasses can also be shaped for correction.

Some safety glasses are designed to fit over corrective glasses or sunglasses. They may provide less eye protection than goggles, face shields or other forms of eye protection but their light weight increases the likelihood that they will actually be used.

Preferably, the pair of glasses will not include a pair of earstems extending rearwardly from the face frame as these may impede the movement of the glasses.

The glasses and typically the frame to which the glass portions are mounted, will preferably be provided with at least one and generally a pair of attachment portions (one located to either lateral side of the frame) suitable to attach the frame of the glasses (and thereby, the glasses themselves) to the at least one second portion.

It is preferred that the attachment means is or includes a pivotable attachment between the glasses and the at least one second portion.

To use the present invention, the distance between the pair of glasses and the face of the wearer can be adjusted by moving the second portion slidably member forwardly and rearwardly in relation to the first portion member. Therefore, the present invention can adequately accommodate those wearing eyeglasses and also people having different facial contours. In addition, the vertical distance between the pair of glasses and the hard hat can be adjusted by moving the second portion slidably up or down in relation to the adjacent first portions. Further, the angle of the pair of glasses can be adjusted by rotating or pivoting the pair of glasses about their attachment point with each second portion.

This adjustment allows the pair of glasses to be placed exactly at eye level without regard of the facial length and/or the tilt of the visor in relation to the face of the wearer. Further, this adjustment allows smaller, more fashionable eyewear to be used as the pair of glasses of the present invention.

The pair of glasses can also be flipped up when in the lowered position so that the pair of glasses is generally parallel to the visor or flipped down so that the pair of glasses is generally perpendicular to the visor. When in use the pair of glasses is flipped down so that it is generally perpendicular to the visor. This allows temporary removal of the pair of glasses from in front of a wearer's face which may be necessary for example if the glasses are tinted and the wearer goes indoors, rather than for protected storage when the helmet is not being worn.

While the hard hat is not in use, the pair of glasses is tucked away in the cavity defined behind the front portion of the hard hat and generally above and behind the visor. To store the pair of glasses, the second portion has a sliding member which is first slid backwardly so that the glasses are aligned with the cavity in the dome portion of the hard hat. The pair of glasses is then oriented to be perpendicular to the visor. Thereafter, the second portion sliding member and the attached pair of glasses are pushed upwardly into the cavity in the dome portion.

Any suitable connection system allowing the movement of the glasses in the directions identified above may be used. There will typically be a pair of first portions and a pair of second portions, one of each portion located at each lateral side of the glasses and hard hat. Preferably, the first portion and the second portion located on one lateral side will form the connection system on that side of the glasses.

At least one of the first and second portions will preferably be configured of a generally U-shaped cross-section members with a basewall and a pair of upstanding sidewalls. Normally, the U-shaped members will be the first portions on each lateral side. Preferably, the U-shaped members will be mounted to the hard hat shell by fixing the basewall of the member to the inner surface of the shell or to the suspension arrangement, with the sidewalls of the U-shaped member facing inwardly towards the dome space. Generally, the first portions will not extend downwardly further than the lower edge of the shell. Also, the first portions will preferably be mounted to the shell in the cavity defined at the front of the hard hat.

The other of the first or second portion of each lateral side (typically the second portion of each side), is a sliding member having a first end and a second end. Each sliding member is typically a flat or planar member. The first end of the sliding member preferably engages with the U-shaped member and the second end of the sliding member preferably engages with the glasses (or the shell, depending upon the configuration).

Alternatively, there may be three members included in the connection system with one of the members performing the function of the first portion and one of the second portion and a third member which engages both the first and second portions. In particular, a first member may be provided attached to the shell of the helmet, a second member may be provided which is slidable forwardly and rearwardly in relation to the first member on one side and a third member may be slidable upwardly and downwardly in relation to the first member on the other side of the second member. In this form, the first member will be substantially planar. The second member will also have a planar surface on a first side to slide over the planar first member but on the opposite surface, a U-shaped channel may be provided to engage with a sliding member having the glasses attached thereto as described above.

The connection system will preferably include a position fixing arrangement to selectively fix the position of the first or second members relative to each other at any one of a plurality of position. The position fixing arrangement preferably includes a plurality of openings located sequentially on one portion of the mechanism and a pawl or similar member on the other portion of the mechanism. Location of the pawl member in an opening will then typically at least temporarily fix the relative location of the members. Normally, the deeper the opening, the greater the force which will be required to dislodge the pawl from the opening and the more secure the position fixing will be.

There may be position fixing arrangements provided in relation to movement up and down as well as forwardly and rearwardly.

A similarly functioning arrangement may be provided to fix the position of the glasses in the pivoting direction. For example, one possible arrangement includes a pair of interleaving toothed portions, one associated with the glasses and the other with the second portion with the teeth engaging to fix the location of one relative to the other.

Provision will typically also be made for the use of an enlarged pair of glasses adapted to be worn over a pair of prescription eyeglasses. A similar mounting assembly to that described above will likely be used. More than one mounting assembly may be provided together with the necessary space in the hard hat for more than one pair of glasses, for example, a pair of prescription eyeglasses and a pair of safety eyeglasses to be used according to the system of the present invention, at the same time.

The hard hat of the present invention may also include provision for the attachment of units including earpieces for use with wired or wireless communication systems or with entertainment systems. These units may include conventional cords similar to those used for mobile phone earpieces. For example, a conventional mobile phone cord has a connector, such as a phone-type plug, to be inserted into a corresponding connector, such as a jack or other receptacle, on a mobile phone or other communications device.

When plugged into a mobile phone or other communications device, the cord permits a user to hear sound through a speaker in an ear piece to be inserted into the user's ear. A section of the cord electrically connects speaker with connector and can include, for example, wires within a protective coating. A cord for use with the present invention may also include a microphone in the ear piece for converting a user's voice into a electrical signal. Certain conventional cords have the microphone separately attached to a section of the cord. The separate microphone is located, for example, approximately 15 to 30 cm from the ear piece so that it is close to a user's mouth when the ear piece is inserted into the user's ear. Other types of separate microphones include boom microphones and other types of ear pieces include headsets having a speaker for placement against or proximate a user's ear.

The embodiment described above may be removable and insertion of cord into a communications device activates or de-activates speaker and microphone to permit hands-free use of the mobile phone or other communications device.

An alternative embodiment includes a separate retractable cord unit for a mobile phone or other communications device. The unit includes a housing for containing a retractable mechanism to retract a cord, which in a particularly preferred embodiment, is or includes a spring-loaded spool or coil. The term "retractable mechanism" includes any mechanism for retracting a cord and permitting extension of at least part of it.

An ear piece is typically attached to a cord that can be extended from and retracted into the housing. The cord can be of any length. However, the cord is preferably long enough to permit the user to attach or otherwise mount the mobile phone or other communications device within the dome space of the hard hat. It is anticipated that the mobile phone or other communications device may be mounted adjacent the exterior of the helmet shell but this is less preferred as it may allow the mobile phone or other communications device to be damaged. The cords can be made of varying lengths for different devices.

The ear piece usually contains a speaker and possibly a microphone. An example of an ear piece having both a speaker and a microphone is described in U.S. Pat. No. 5,363,444, which is incorporated herein by reference. The ear piece need not contain a microphone since an external microphone may be used such as a separate microphone attached to the cord. Also, certain wireless devices, such as an MP3 player or a personal stereo, may only generate sound and thus have no requirement or capability for receiving sound.

Ear pieces can include both devices to be inserted into a user's ear, such as an ear plug with a speaker, or devices to be placed against or proximate a user's ear, such as headsets or similar devices. Also, an ear piece can be either directly connected to the cord or attached to it through a detachable clip that permits a user to connect different types of ear pieces to the cord.

The ear piece may allow communication through any number of a variety of protocols including contemporary modes such as Bluetooth, wireless or hard wired, radio frequency, infrared or others. The ear piece may be a part (permanently connected thereto) of a mobile phone or other communications device or may be removably attachable thereto. For the purposes of the present invention, however, all parts of the retractable earpiece unit and communications device may be mounted within the dome space of the hard hat, preferably near the lower edge of the shell.

A cord connector, such as a phone-type plug, can be attached to housing or a length of cord and is electrically connected to cord, for example, within the housing. Cord connector can be inserted into device connector on mobile phone. The type of cord connector may depend upon the type of phone or device connector within the mobile phone or other wireless device. Although a phone-type plug is shown for connecting with a connector for illustrative purposes, other connectors can be used. The term "cord connector" includes any type of removable connector for providing electrical communication. The term "device connector" includes any type of connector for receiving a cord connector for providing electrical communication.

When in use, cord connector is inserted into a device connector and housing is mounted inside the dome space of the hard hat, preferably near the lower edge of the shell. A user can extend cord by grasping the ear piece or a section of the cord and pulling it out of housing. A stop mechanism in housing can hold the cord at particular extended positions so that it is not under tension from the spring-loaded spool or other retractable mechanism. Once held in position, the user can extend cord slightly by pulling on it in order to release the step mechanism, in one exemplary implementation and permit the spring-loaded spool or other retractable mechanism to retract cord into housing.

The term "stop mechanism" includes any mechanism for releasably holding a cord at least at one particular extended position. Examples of stop mechanisms include mechanisms that hold and release the cord through force applied to the cord itself or through other devices such as a release button external to the housing and attached to a mechanism internal to the housing to hold the cord in place. Manipulation of the release button, in that example, activates and releases the stop mechanism.

An aperture in housing is typically provided and should be large enough to permit passage of cord and small enough to not permit passage of the ear piece. Therefore, when retracted, the ear piece rests against housing. Alternatively, cord can include a stopper, such as a rubber or plastic washer, on cord and proximate ear piece in order extend the ear piece a certain amount when the cord is fully retracted. The stopper may make it easier for a user to grasp and extend the cord by holding the stopper and may also help protect the ear piece by allowing the user to extend the cord without grasping the ear piece. The stopper can be located at any particular distance from the ear piece on the cord and can possibly be adjustable by permitting a user to slide the stopper along the cord.

One retractable cord unit can have multiple earpieces for use in both ears and according to the present embodiment, providing a pair of earpieces may be used as a form of protection against load and/or repetitive sounds on a site.

Typically, the dome or shell of the hard hat may be shaped to provide at least one cavity or depression about the dome portion for receiving the ear piece unit and other equipment inside the shell but spaced from the wearer's head. As the ear piece and communications device will typically be electrical in nature, the hard hat may also include positions for batteries or the like to be similarly mounted in the shell. The mounting of equipment other than the glasses will generally be to the sides or rear of the hard hat.

The hard hat of the invention may further include a secondary mounting assembly adapted to mount a face shield to the hard hat. Preferably the face shield will be similarly moveable between a use condition in which the face shield is disposed in front of a wearer's face and possibly neck region and a storage condition wherein the face shield is stored at least partially in the dome portion of the hard hat.

Preferably the face shield is a unitary member typically formed of at least partially transparent material. The face shield is preferably arcuate in section to substantially match the contours of a wearer's face.

The face shield preferably extends from the brow to below the chin and across the entire width of the face.

Windows are available in both removable and fixed as well as lift-front designs:
Removable windows allow the replacement of damaged windows.
Lift-front windows may be raised, as needed, or left in the lowered position.

Plastic windows:
    Protect against light impact.
    May include a glass insert.
    Are available clear or filtered.
Wire-screen windows:
    May include a plastic/glass insert.
    Protect against some moderate impact.

Wire screen face shields are not recommended for use involving chemical or liquid hazards. A specialised face shield may be provided for use in welding or similar activities.

Face shields are considered secondary protectors to be used in addition to primary protection such as safety spectacles or goggles.

Preferably, the face shield of the invention is adapted to be stored in the dome of the helmet, typically between the shell of the hard hat and the suspension arrangement. The angle of the face shield may be adjusted utilising a similar system to that used to mount the pair of glasses to the hard hat. The face shield will preferably be capable of the same adjustment as the glasses, namely upwardly and downwardly and the separation distance from the wearer's face may be adjustable.

BRIEF DESCRIPTION OF THE DRAWINGS

Various embodiments of the invention will be described with reference to the following drawings, in which.

DETAILED DESCRIPTION OF THE PREFERRED EMBODIMENT

According to the illustrated preferred embodiment, a hard hat with attached glasses is provided.

Figure 1:
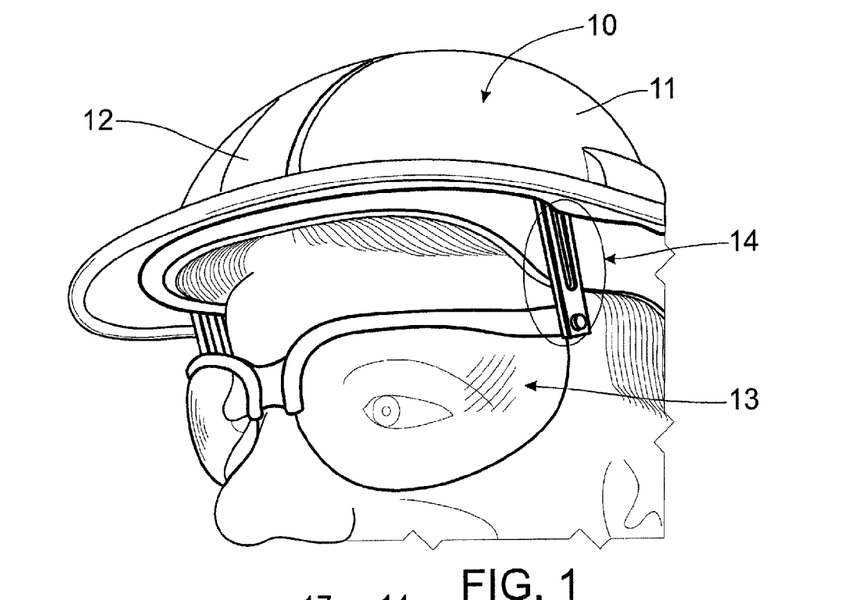
FIG. 1 is a perspective view of a hard hat with attached glasses according to a preferred embodiment of the present invention in use.
Figure 2:
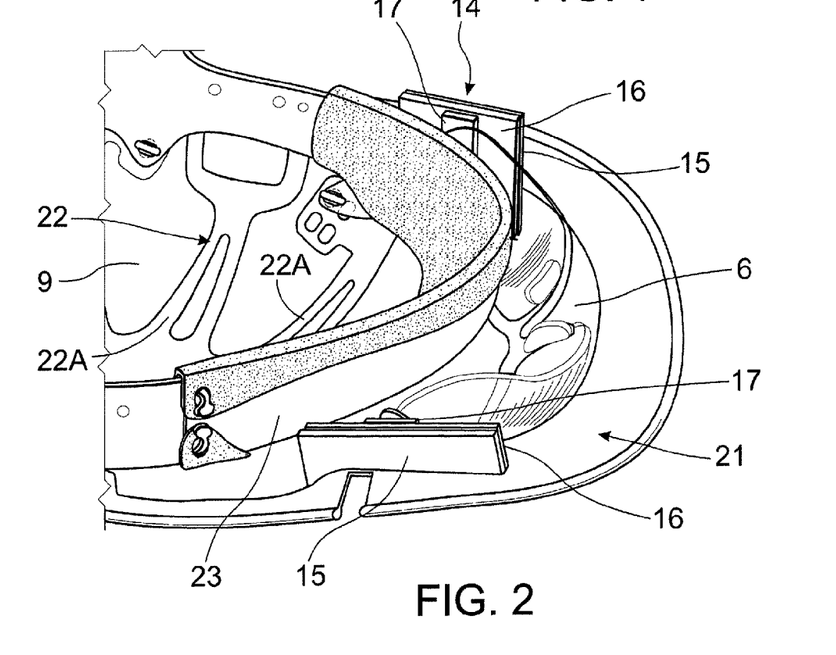
FIG. 2 is a detailed view form the side of a connection assembly according to a preferred embodiment of the present invention, with the glasses in the stored position.
Figure 3:
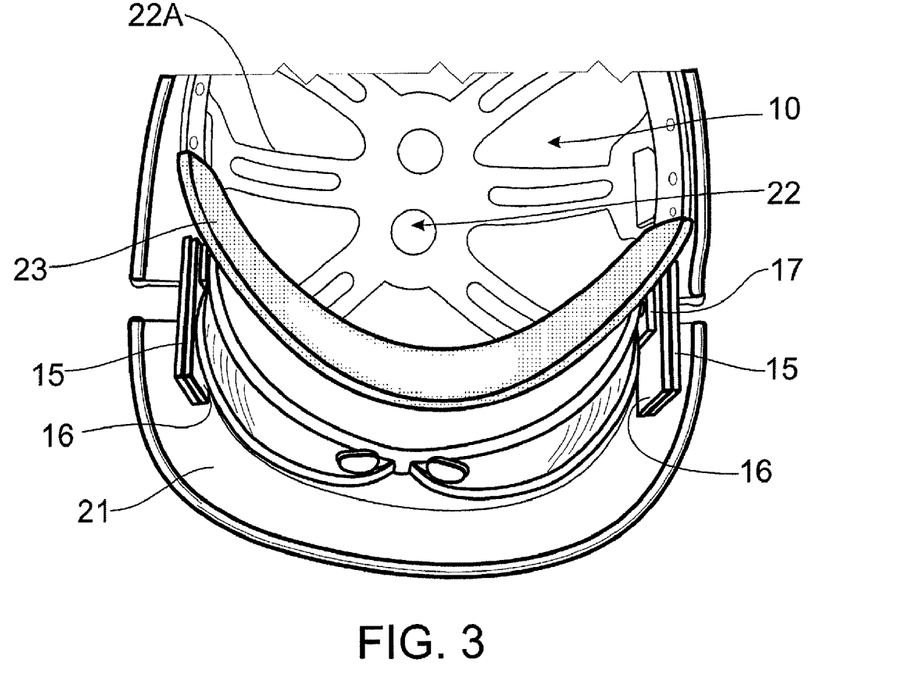
FIG. 3 is a detailed view from the front underside of a connection assembly according to a preferred embodiment of the present invention, with the glasses in the stored position.

As illustrated in FIG. 1, the preferred embodiment of the hard hat with attached glasses includes a hard hat or helmet 10 having a dome portion 11, the dome portion 11 having an interior surface defining a dome space 9 shown in FIG. 2 for receiving a wearer's head and a generally vertical front portion 12. There is also a pair of glasses 13 and a connection system 14 connecting the pair of glasses 13 to the hard hat 10. The connection system is adapted to allow adjustment of the position of the glasses inside said dome space and down out of said dome space and pivotable about a substantially horizontal axis.

According to the preferred embodiment, the connection system 14 also provides for movement of the glasses forwardly and rearwardly relative to a wearer's face.

According to the preferred embodiment as illustrated, the connection system 14 includes a first member 15 extending into the dome space 9 near the front portion 12 of the helmet 10. The first member 15 is attached to the dome portion 11 and is substantially planar.

The connection system 14 also includes a second member 16 which is slidable forwardly and rearwardly in relation to the first member 15 and a third member 17 mounting the pair of glasses 13 and holding the pair of glasses 13 generally vertically for placement in front of a user's eyes as illustrated in FIG. 1. The third member 17 is slidably connected to the second member 16 to be slidable up inside the dome portion 11 and down out of the dome portion 11 generally parallel to the front portion of the helmet to move the glasses 13 up and down. The second member 16 has a U-shaped channel defined by a base wall 18 and upstanding sidewalls 19 to engage with the sliding third member 17 having the glasses 13 attached thereto. The second member 16 has a planar surface on a first side to slide over the planar first member 15 forwardly and rearwardly. The third member 17 also has an elongate slot 8 which is attached to stop pin 7.

There is also a pivot connection 20 between the pair of glasses 13 and the third member 17 to allow rotation of the glasses 13.

Figure 4:
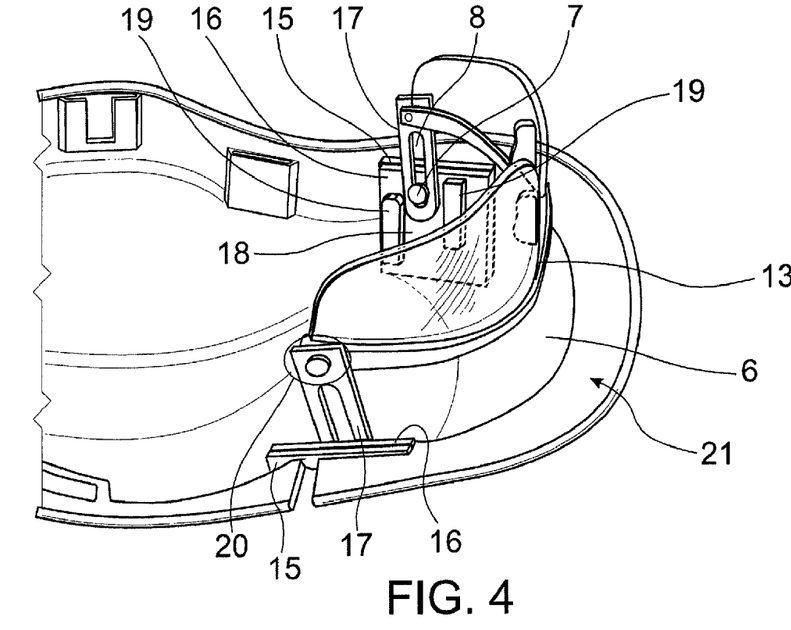
FIG. 4 is a detailed view from the side of a connection assembly according to a preferred embodiment of the present invention, with the glasses in the use position.

The hard hat 10 and glasses 13 of the present invention preferably allow a wearer with increased convenience. The pair of glasses 13 provided as attached to the hard hat 10 according to the illustrated embodiment are moveable between a storage position in which the pair of glasses 13 is stored inside the dome portion 11 of a hard hat 10, as illustrated in FIG. 2 and a use position in which the glasses 13 are adjacent a wearer's eyes and/or face, as illustrated in FIG. 1 or 4.

The hard hat of the illustrated embodiment has a visor portion 21 provided which is integrally formed with dome portion 11.

The hard hat includes a suspension arrangement 22 within the dome portion 11 and attached thereto. The suspension arrangement 22 is spaced from the inner surface of the hard hat 10 to provide clearance for ventilation and move importantly shock absorption if the exterior of the hard had is impacted.

The suspension arrangement 22 of the illustrated embodiment includes a plurality of straps 22A located in the dome space to maintain the spacing between the dome portion 11 and the wearer's head. The straps 22A of the illustrated embodiment are resilient to flex when loads are applied and thereby absorb the shock of blows thereto.

The suspension arrangement of the illustrated embodiment includes a circumferentially extending strap 23 of adjustable length and a crown support. The circumferentially extending strap is mounted relative to the helmet shell at a number of spaced apart attachment locations by appropriate attachment means.

Importantly, the dome space of the hard hat 10 of the illustrated embodiment is configured to provide a cavity 6 or similar area between the front portion 12 of the helmet 10 and the front of the suspension arrangement 22 as illustrated in FIG. 2 in particular. The cavity will normally be a shaped cavity integrally formed in the helmet 10. The hard hat may be shaped to provide other cavities or depressions about the dome portion 11 for receiving equipment inside the shell but spaced from the wearer's head.

The glasses 13 of the illustrated embodiment are protective or safety eyewear. Safety glasses are usually made with shatter-resistant plastic lenses to protect the eye from flying debris.

To use the present invention, the distance between the pair of glasses 13 and the face of the wearer can be adjusted by moving the second member 16 sliding member forwardly and rearwardly in relation to the first member 15. Therefore, the present invention can adequately accommodate those wearing eyeglasses and also people having different facial contours. In addition, the vertical distance between the pair of glasses 13 and the hard hat 10 can be adjusted by moving the third member 17 up or down in relation to the second member 16. Further, the angle of the pair of glasses 13 can be adjusted by rotating or pivoting the pair of glasses 13 about their attachment point 20 with the third member 17.

This adjustment allows the pair of glasses 13 to be placed exactly at eye level without regard of the facial length and/or the tilt of the helmet in relation to the face of the wearer. Further, this adjustment allows smaller, more fashionable eyewear to be used as the pair of glasses of the present invention.

While the hard hat 10 is not in use, the pair of glasses 13 is tucked away in the cavity 6 defined behind the front portion 12 of the hard hat 10 and generally above and behind the visor 21. To store the pair of glasses 13, the second member 16 is first slid backwardly so that the glasses 13 are aligned with the cavity in the dome space of the hard hat 10. The pair of glasses 13 is then oriented to be perpendicular to the visor 21. Thereafter, the third member 17 and the attached pair of glasses 13 is pushed upwardly into the cavity in the dome portion 11.

The connection system may also include a position fixing arrangement (not shown) to selectively fix the position of the members relative to each other at any one of a plurality of positions.

The hard hat 10 of the present invention may also include provision for the attachment of units including ear pieces for use with wired or wireless communication systems or with entertainment systems, which are not illustrated.

In the present specification any claims (if any), the word "comprising" and its derivatives including "comprises" and "comprise" include each of the stated integers but does not exclude the inclusion of one or more further integers.

Reference may be made to another embodiment shown in FIGS. 5-8 of another hard hat with attached safety glasses combination.

Figure 5:
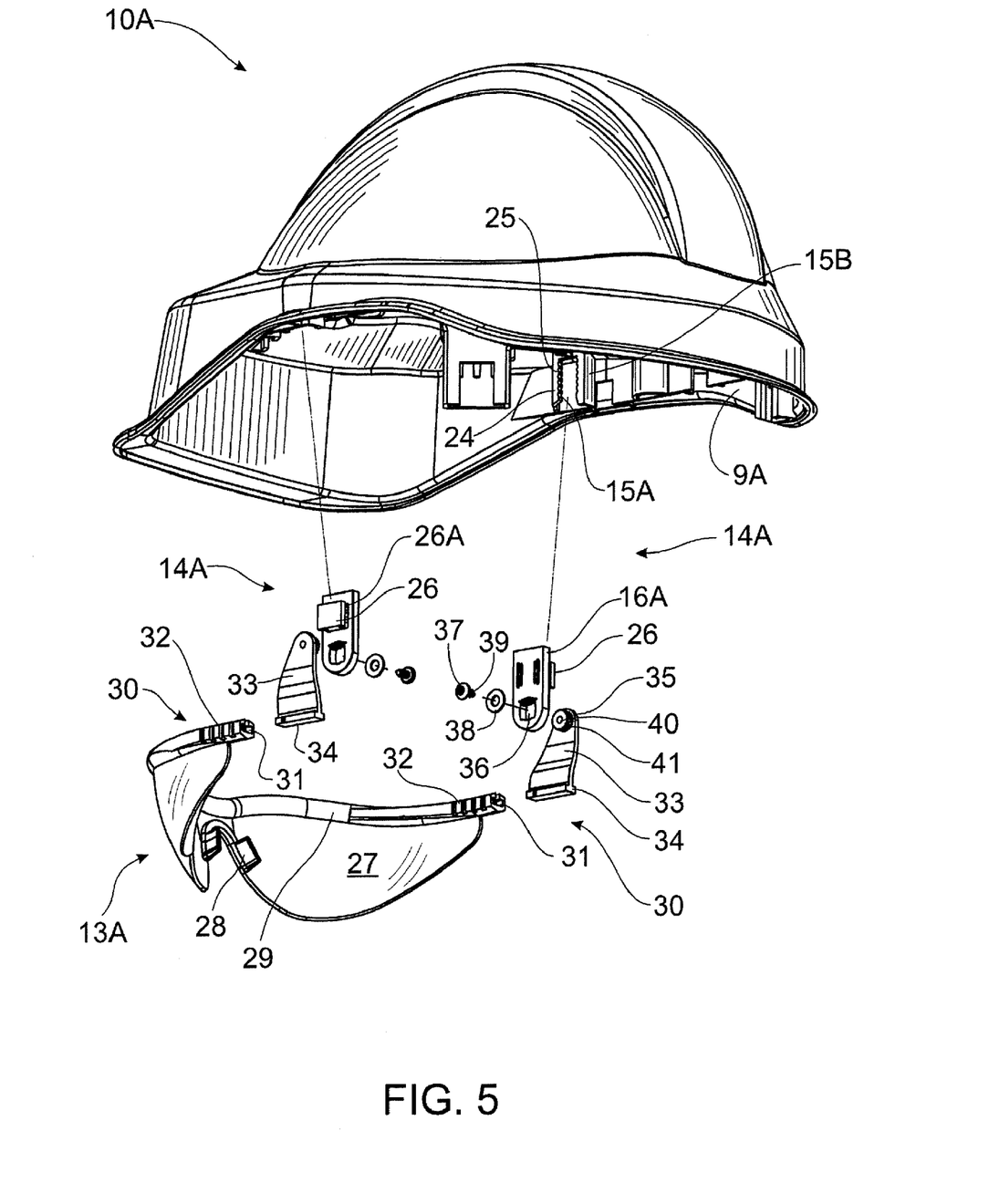
FIG. 5 is an exploded perspective view of another embodiment of the invention.

In FIG. 5, there is shown hard hat 10A and attached safety glasses 13A. There is also shown connection system 14A between hard hat 10A and safety glasses 13A. Connection system 14A includes a first member or channel 15A having a pair of side edges 24 each having ratchet projections 25. Channel 15A has a body 15B which is fixedly attached to the interior surface 9A of hard hat 10A. It will be noted from FIG. 5 that there is also included a plate 16A or second member slidable in channel 15A whereby plate 16A can be held in a number of adjustment positions by ratchet projections 25. Plate 16A has a protrusion 26 having ratchet teeth 26A which is retained within the interior of channel 15A as shown.

Glasses 13A also include lenses 27, nose protrusions 28 and an elongate frame 29. There are also provided on each end 30 of frame 29 a channel 31 which has abutments 32.

There are also provided a pair of third members or attachment plates or brackets 33 which each have a bottom flange or abutment 34 for engagement with an adjacent channel 31. Abutments 32 provide positions of adjustment for flange 34 within channel 31. Each attachment plate 33 also has a pivot projection 35 which engages with an adjacent aperture 36 of plate 16A. Each pivot projection 35 is retained within a locked position within aperture 36 by the use of fastener 37 and washer 38. Each fastener has a screw threaded part 39 which engages with socket 40 in each pivot projection 39.

Each pivot projection 39 is also provided with a milled or corrugated outer surface 41 to also provide for a number of adjustment positions of glasses 13A relative to hard hat 10A.

Figure 6:
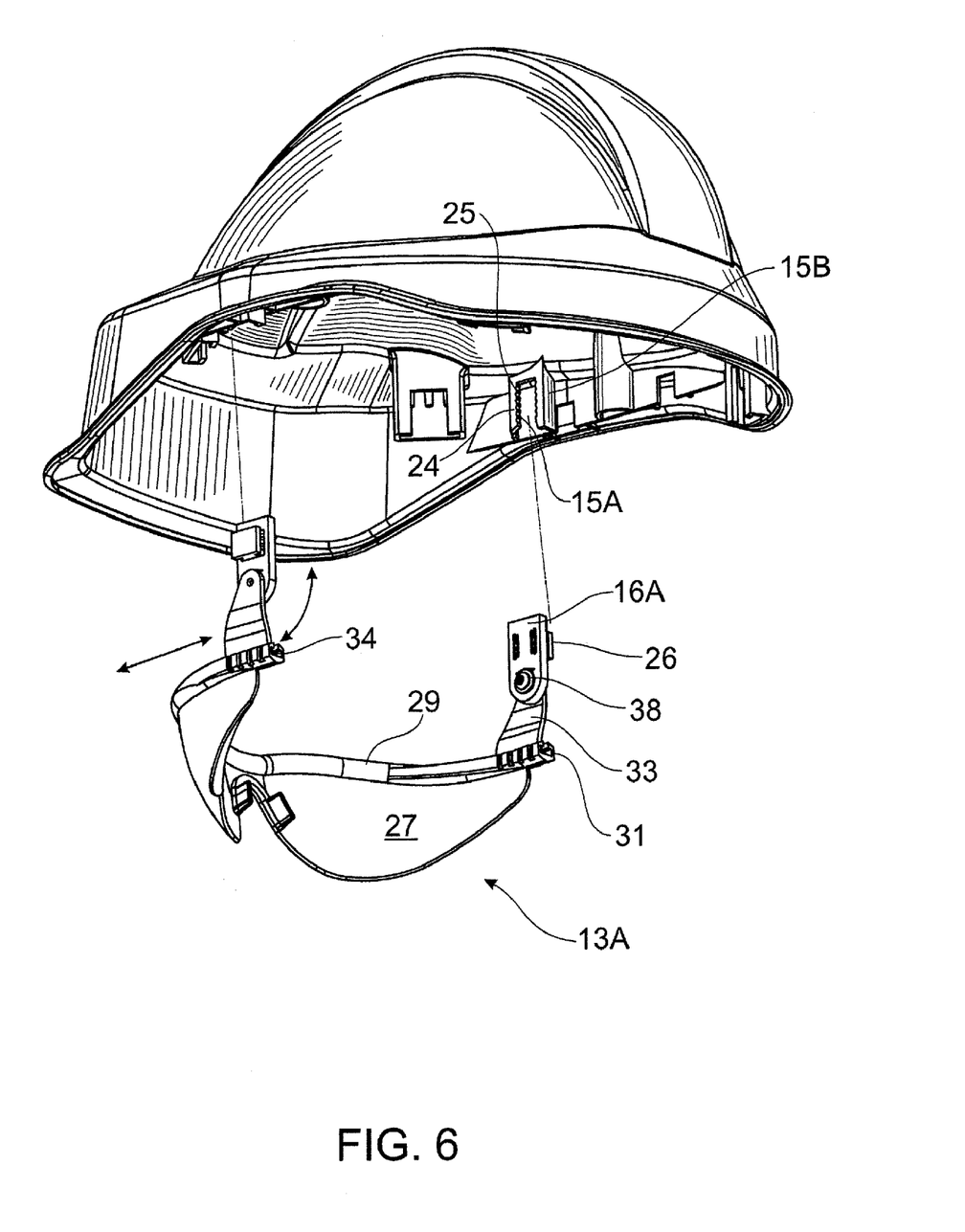
FIG. 6 is a partially assembled perspective view of the embodiment shown in FIG. 5.

FIG. 6 shows flange 34 engaged with channel 31 and pivot projections 39 retained in each aperture 36.

Figure 7:
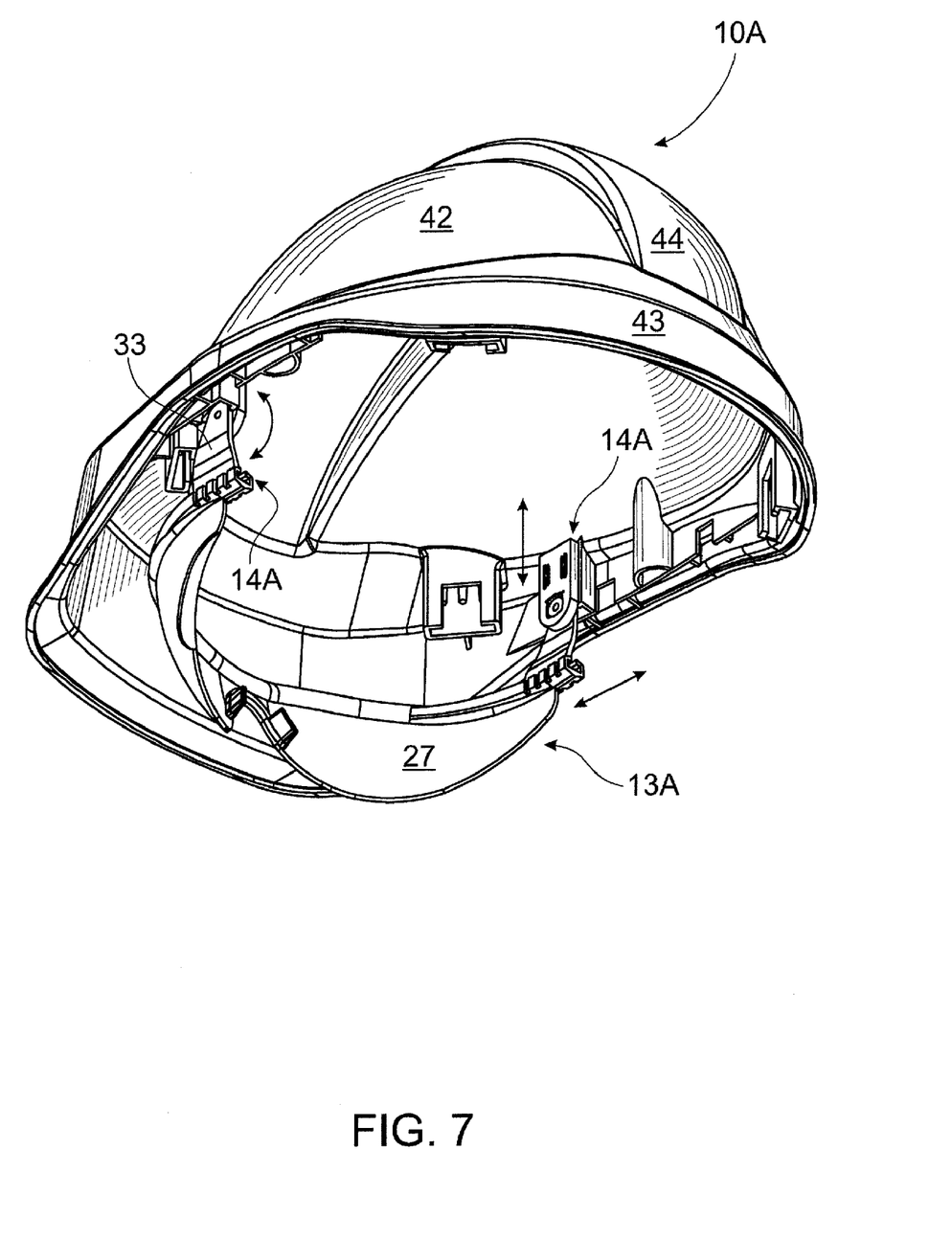
FIG. 7 is a fully assembled view of the embodiment shown in FIG. 5.

FIG. 7 shows each plate 16A engaged with a corresponding channel 15A.

Figure 8:
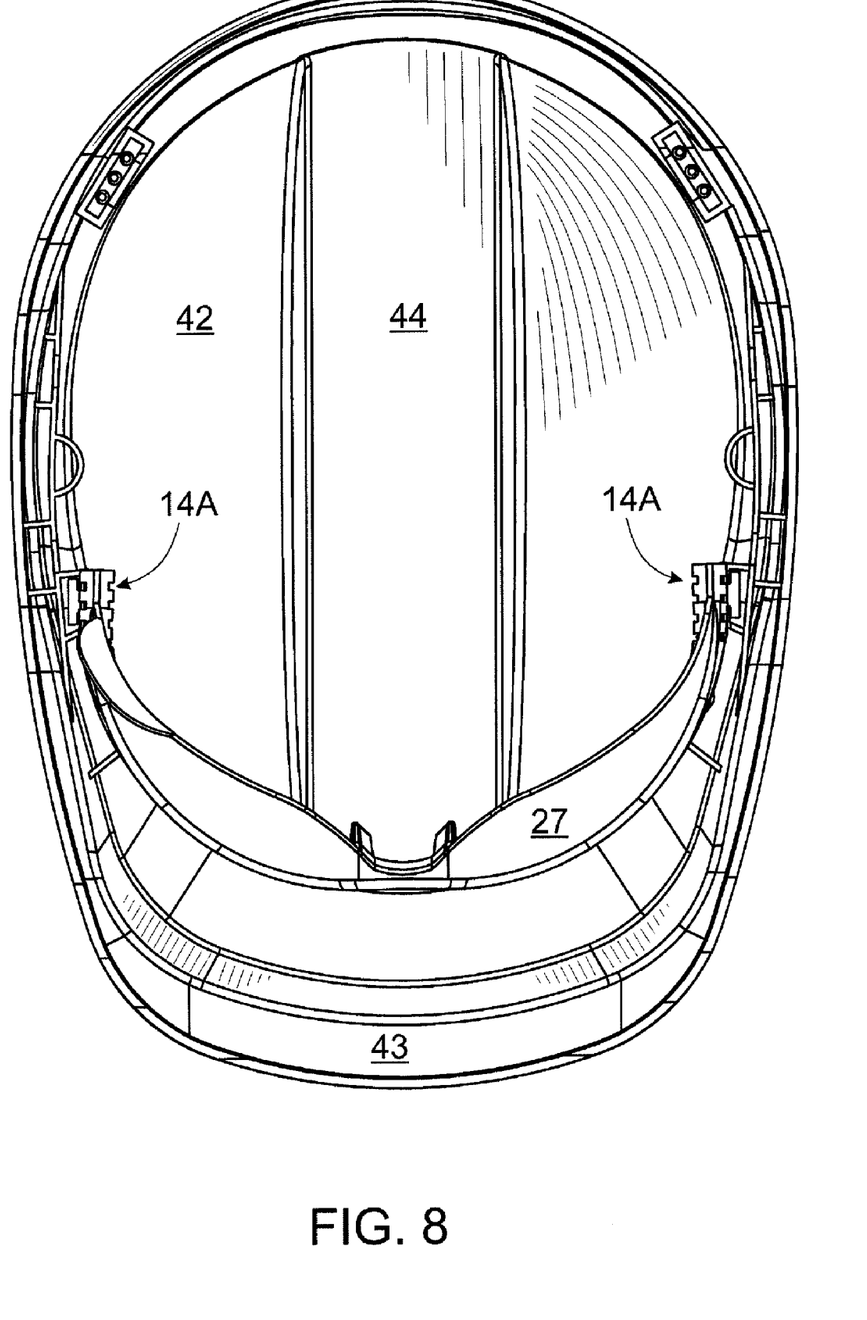
FIG. 8 is a plan view of the embodiment shown in FIG. 5.

FIG. 8 shows a plan view of hard hat 10A including dome 42, visor 43 and reinforcement strip 44.

The arrows in bold in FIG. 6 show movement of safety glasses 13A relative to hard hat 10A (i) horizontally by movement of flange 34 within channel 31; and (ii) pivotally by pivotal movement of glasses 13A having regard to pivot projections 39 pivoting in apertures 36. In FIG. 7, vertical movement is shown by the arrow in bold having regard to movement of protrusion 26 in channel 15A.

The invention claimed is:

1. A hard hat with attached pair of glasses including a dome portion, the dome portion having an interior surface defining a dome space for receiving a wearer's head and a separate interior cavity, said interior surface including a generally vertical front portion which is located adjacent to the interior cavity, a pair of glasses which are stored in said internal cavity when not in use whereby said dome portion allows storage of the glasses and receiving the wearer's head at the same time and a visor extending forwardly and substantially horizontally of the vertical front portion so as to protect the eyes of the wearer and a connection system connecting said pair of glasses to said hard hat, the connection system adapted to allow adjustment of the position of the glasses inside said dome portion and down and out of said dome portion and pivotable about a substantially horizontal axis, the connection system including at least one first portion extending inside said dome portion near said generally vertical front portion, at least one second portion mounting said pair of glasses and holding said pair of glasses generally vertically for placement in front of a user's eyes, the at least one second portion being slidably connected to the at least one first portion to be slidable up inside said dome portion and down out of said dome portion generally parallel to said front portion of the interior surface to move the glasses up and down and said connection system also facilitates movement of the glasses forwardly and rearwardly relative to the at least one first portion wherein, (i) the dome space has a suspension arrangement or padding to maintain a spacing between the dome portion and the wearer's head and said interior cavity is separated from said dome space by part of said suspension, arrangement or padding; (ii) to thereby form a separate shaped cavity in the form of a recess or ledge adjacent the dome space and integrally formed within said interior surface; (iii) said vertical front portion is spaced from said dome space by said interior cavity since the pair of glasses is configured to be in front of the wearer's head when not in use; (iv) said interior cavity is located behind the visor such that the pair of glasses is configured to be positioned above and behind the visor when not in use; and (v) said up and down movement of the glasses facilitates movement of the glasses into the interior cavity.

2. A hard hat according to claim 1, wherein the attached glasses are removable from the hard hat.

3. A hard hat according to claim 1, wherein at least a portion of the vertical front portion is configured to closely match the shape of the glasses.

4. A hard hat according to claim 1, wherein at least a portion of the vertical front portion is lined to protect the glasses from damage when in the storage position.

5. A hard hat according to claim 1, wherein the glasses are provided with a pair of attachment portions, one located to either lateral side of the glasses suitable to attach the glasses to the at least one second portion.

6. A hard hat according to claim 5, wherein the attachment portions includes a pivotable attachment between the glasses and the at least one second portion such that the pair of glasses can be flipped up when in the lowered position so that the pair of glasses are away from the wearer's face or flipped down so that the pair of glasses are in a use condition relative to a wearer's face without adjusting the position of the at least one first portion relative to the at least one second portion.

7. A hard hat according to claim 1, wherein each at least one first portion is configured with a U-shaped cross-section member with a basewall and a pair of upstanding sidewalls.

8. A hard hat according to claim 7, wherein each at least one first portion does not extend downwardly further than the lower edge of the dome portion.

9. A hard hat according to claim 7, wherein each at least one second portion is a sliding member having a first end and a second end, the first end engaging the U-shaped member and the second end of the sliding member engaging the glasses.

10. A hard hat according to claim 1, wherein the connection system includes a pair of first members wherein each of the first members are attached to the interior surface on opposite sides thereof and wherein said at least one first portion comprises a pair of second members which are attached to a respective first member for slidable movement thereto in a generally horizontal direction and said at least one second portion comprises a pair of third members each attached to the pair of glasses at each end thereof and slidably attachable to an adjacent second member for movement in a generally vertical direction to move the glasses from a storage position inside the dome space to an extended operational position externally of the dome portion for use by a wearer.

11. A hard hat as claimed in claim 10, wherein each of the first and second members have planar surfaces to facilitate the slidable movement of each of the second members relative to an adjacent first member.

12. A hard hat as claimed in claim 11, wherein each of the second members has a generally U-shaped channel on an inner surface thereof on an opposing side to said planar surface and said third member slides in said U-shaped channel.

13. A hard hat as claimed in claim 12, wherein said third member has an elongate slot for receiving a stop protrusion attached to the second member to prevent accidental removal of each third member from an adjacent second member.

14. A hard hat as claimed in claim 10, wherein each third member at one end thereof is pivotally attached to an adjacent end of the pair of glasses.

15. A hard hat according to claim 1, wherein more than one connection system is provided together with the necessary space in the hard hat for more than one pair of glasses.

16. A hard hat according to claim 1, wherein the hard hat includes provision for the attachment of units including ear pieces for use with wired or wireless communications systems or with entertainment systems.

17. A hard hat according to claim 1, wherein the connection system on each opposing side of the interior space includes a first member fixedly attached to the interior surface and a second member attachable to the first member and vertically moveable thereto and there also being provided a third member attached to said second member and also attached to said pair of glasses to facilitate forward or rearward movement of the glasses relative to said first member.

18. A hard hat as claimed in claim 17, wherein each of the first members comprises a channel shaped member having a pair of opposed edges each having a plurality of ratchet projections to provide positions of vertical adjustment of each second member relative to a respective first member.

19. A hard hat as claimed in claim 17, wherein each second member has an engagement protrusion located on an outer surface thereof for engagement with an adjacent U-shaped channel.

20. A hard hat as claimed in claim 17, wherein each second member also includes an attachment aperture for engagement with a pivot projection located at each end of the pair of glasses.

21. A hard hat as claimed in claim 20, wherein the pivot projection has a corrugated outer surface to provide positions of pivotal adjustment of the glasses relative to each second member.

22. A hard hat as claimed in claim 17, wherein each third member comprises an attachment plate located at each end of the glasses which each carry an associated pivot projection and wherein an adjacent end of each attachment plate has an engagement protrusion slidably engageable in an associated channel located at each end of a frame of the glasses.

23. A hard hat as claimed in claim 22, wherein each of the channels located at each end of the frame has a plurality of ratchet projections to provide for a multiplicity of adjustment positions of the glasses relative to each attachment plate.

24. A hard hat as claimed in claim 1 which includes a pair of connection systems, wherein each connection system connects a respective end of said pair of glasses to said hard hat on opposing sides of said interior surface, each connection system including a first member attached to said interior surface which corresponds to said at least one portion, a second member slidably movable relative to the first member and thus corresponding to said at least one second portion and a third member interconnecting an adjacent end of the glasses to the second member, said third member also being pivotally attached to an adjacent end of the glasses characterized in that (i) the interconnection between the first member and the second member or (ii) between the third member and the glasses facilitates horizontal movement of the glasses relative to said interior surface and (iii) the interconnection between the first and second member or (iv) between the second and third member facilitates vertical movement of the glasses relative to said interior surface.

25. A hard hat as claimed in claim 24, wherein the first member and the second member are slidably connected to each other to facilitate said horizontal movement and the second and third members are slidably connected to each other to facilitate said vertical movement.

26. A hard hat as claimed in claim 24, wherein the second member is slidably connected to the first member to facilitate said vertical movement and the glasses at each end are slidably connected to an adjacent third member to facilitate said horizontal movement.

27. A hard hat according to claim 1, wherein said connection system facilitates, in sequence, horizontal movement of the pair of glasses rearwardly from a use position until aligned with the interior cavity and then vertical movement upwardly into the interior cavity to a storage position.

28. A hard hat according to claim 1, wherein said interior surface includes a vertical surface extending downwardly from the dome space and the visor includes a horizontal surface extending forwardly from the vertical surface.

* * * * *